United States Patent [19]

Smith

[11] Patent Number: 5,000,216

[45] Date of Patent: Mar. 19, 1991

[54] PRESSURE RELIEF VALVE

[76] Inventor: Roger R. Smith, 7261 Lyons Rd., Imlay City, Mich. 48444

[21] Appl. No.: 567,029

[22] Filed: Aug. 14, 1990

[51] Int. Cl.⁵ .............................................. F16K 17/14
[52] U.S. Cl. .................................. 137/70; 137/512.4; 137/852
[58] Field of Search .................. 137/70, 512.15, 512.4, 137/852

[56] References Cited

U.S. PATENT DOCUMENTS

| | | | |
|---|---|---|---|
| 2,657,899 | 11/1953 | Kohler et al. ................ | 137/512.4 X |
| 2,688,978 | 9/1954 | Von Wangenheim ......... | 137/512.15 |
| 3,354,903 | 11/1967 | Caruso ........................... | 137/512.15 |
| 4,489,753 | 12/1984 | Frenkel ......................... | 137/512.4 X |

Primary Examiner—John Rivell
Attorney, Agent, or Firm—Peter A. Taucher; David L. Kuhn; Gail S. Soderling

[57] ABSTRACT

An improved pressure relief valve is disclosed which provides a simple inexpensive structure to exhaust a pressure filled bag, such as an airbag, in a controlled manner when the pressure in the bag exceeds a predetermined level.

4 Claims, 1 Drawing Sheet

PRESSURE RELIEF VALVE

GOVERNMENT INTEREST

The invention described herein may be manufactured, used and licensed by or for the Government for governmental purposes without payment to me of any royalty.

BACKGROUND OF THE INVENTION

1. Field of the Invention

In one aspect this invention relates to pressure vessel valves. In another aspect this invention relates to relief valves to restrict and control release of fluids from a container containing pressurized fluid.

2. Description of the Prior Art

Pressurized flexible containers are used in a number of applications such as automobile airbags, and gas or liquid filled bags in shock absorbing pads. Many times the flexible containers are initially sealed with the fluid under pressure or modest pressure but designed to have a release port which is activated when the vessel is stressed. The fluid in the vessel will exit in a controlled manner to provide a controlled cushioning action upon impact.

Many relief valve structures have been proposed. Generally the structures are either complex and expensive, or do not provide much control for the exhaust.

BRIEF SUMMARY OF THE INVENTION

The present invention provides an inexpensive relief valve structure which provides controlled release of a fluid from a vessel when needed. The improved relief valve is designed to be attached to the surface of a vessel containing a fluid to control the flow of fluid through a relief port. The improved valve of this invention has a fluid impervious cap which is adapted to seal the relief port of the vessel when the cap is in contact with the relief port. An annular shear plate is disposed between the impervious cap and the pressure vessel; the impervious cap, annular shear plates and the outer surface of the pressure vessel are joined together by a plurality of radially extending membranes. When fluid is exiting from the vessel the membranes hold the shear plates and the cap in a spaced parallel relationship.

DETAILED DESCRIPTION OF PREFERRED EMBODIMENTS

Referring to the accompanying drawing in which like numbers refer to like parts, a pressure vessel 10 has a relief valve 12 according to this invention disposed on the vessel's outer surface 14 covering a relief port 16.

Figure 1:
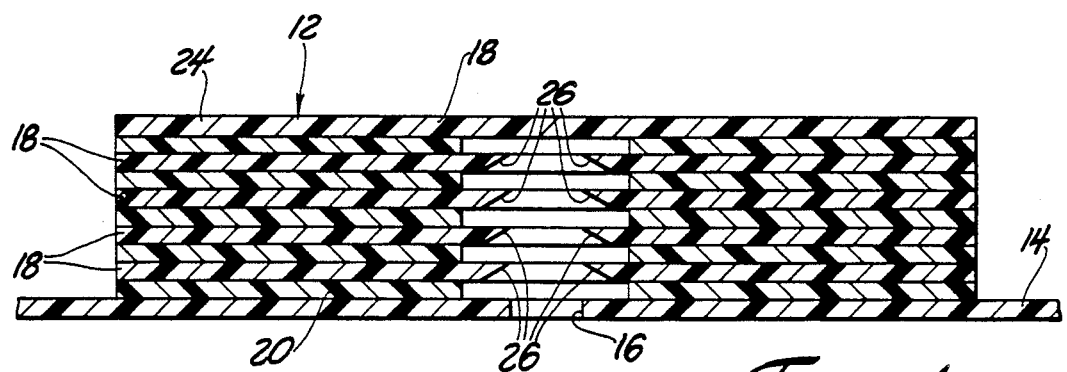
FIG. 1 is a side view in section of one embodiment of this invention.
Figure 2:
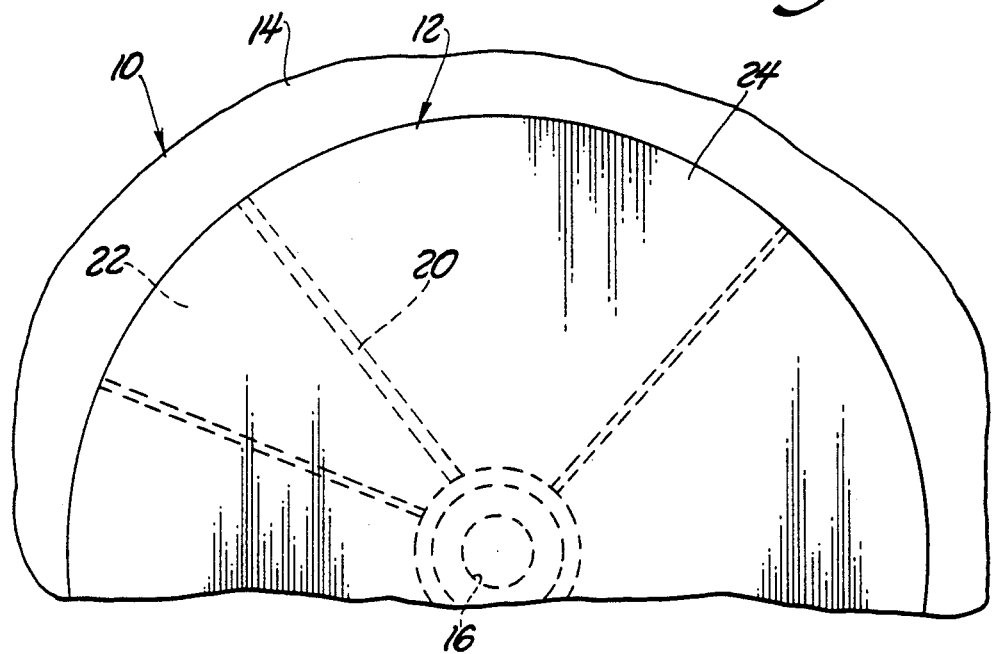
FIG. 2 is a partial top view of the invention of FIG. 1.

The relief valve 12 as shown, has a plurality of annular shear plates 18 joined to each other and the pressure vessel by a plurality of radially extending collapsible membranes 20. The membranes 20 are attached to the shear plates 18 from a position at the periphery to a location near the inner edge of the annulus at the center of the shear plates 18 and the shear plate juxtaposed the pressure vessel 10 is attached from a point near its periphery to a point near the relief port. The membranes 20 are formed of a flexible material such as plastic, or impregnated fabric so the structure can be compressed close to the surface 14 of the pressure vessel 10. The membranes can be attached to the pressure vessel, the shear plates and the impervious cap by mechanical means or adhesives the exact means of attachment not forming a part of this invention. In the collapsed position, the shear plates 18 will be essentially impervious to the flow of fluid and will not allow the free flow of fluid from the relief port to the ambient atmosphere between the individual shear plates. When the relief valve is in the exhaust or relief position as shown in FIG. 1, the flexible membranes 20 are in the unflexed extended position holding the annular shear plates in a spaced parallel configuration. Adjacent membranes 20 and adjacent shear define a plurality of segmental cavities 22 which have a relatively narrow portion near the relief port and a relatively wider portion near the periphery.

The entire relief valve 12 is capped by means of a fluid impermeable cap 24, which is attached to the shear plate 22 distal the pressure vessel to provide an impermeable surface on the relief valve forcing fluid to flow through the segmental cavities to exit the pressure vessel.

The various layers can be formed from various types of material depending on the pressures to be encountered and the fluid to be controlled. The shear plates can be formed from flexible or rigid material and the cap can be formed of similar materials. However the cap must be sufficiently rigid to maintain the relief valve sealed when in the closed position.

The shear plates 18 have a tapered face 26 on the annular opening on the inside of the shear plate. The tapered face provides an open surface which will be constantly exposed to the fluid pressure in the valve even when the plates are held in the closed, sealing compressed position. When the pressure in the vessel is to be relieved, the fluid will be able to act on the tapered surface to force the shear plates 18 apart. The tapered surface 26 will prevent the shear plates 18 from sticking together or failing to open fully when the pressure within the vessel needs relief.

The relief valve 12 is shown in its open or relief position. The valve could be collapsed to maintain a minimum pressure in the vessel. The means for maintaining the valve in the closed position could be a mechanical clamp or the layers could be held together with an adhesive which ruptures at the desired pressure to provide controlled relief of the vessel 10.

The spacing between the shear plates 18 will be sized to provide a constrained flow of fluid between the plates. In general it would be expected that spacing between the shear plates would be on the order of 0.01 inch. At this spacing, the fluid flowing between the plates will be sheared as it passes through the sectional shaped cavities 22. Fluid flow between the shear plates 18 can controlled by adjusting the spacing between the layers to compensate for fluid viscosity. The spacing, number of layers, gap size and elasticity of the membranes 20 all combine to give the relief valve its unique characteristics.

Various modifications and alterations will become apparent to those skilled in the art with out departing from the scope and spirit of this invention and it is understood that this invention is not limited to the illustrative embodiments set forth above.

What is claimed is:

1. A pressure relief valve mounted on a pressurized vessel having a relief port the relief valve being designed to provide a controlled release of fluid from the vessel comprising: a fluid impervious cap which will seal the relief port when pressed against the pressure vessel relief port; at least one annular shear plate disposed between the pressure vessel outer surface and the fluid impervious cap the annulus of the shear plate being coaxially aligned with the relief port; a plurality of collapsible radially extending membranes attached to the shear plates, pressure vessel and impervious cap which allow the relief valve to be compressed to a closed position where the impervious cap seals the relief port and which holds the fluid impervious cap and annular shear plate in a spaced relationship parallel to the surface of the pressure vessel during release of fluid from the vessel.

2. The pressure valve of claim 1 wherein the inner annular surface of the shear plate is disposed at an angle to the face of the shear plate to form a tapered surface whereby an exposed surface is always presented to the fluid at the relief port even when the valve in the closed sealing position.

3. The pressure relief valve or claim 1 where the shear plates and impervious cap are consolidated in the closed sealing position by means of an adhesive between the layers which will rupture at a predetermined pressure level to allow relief.

4. A pressure relief valve mounted on a pressurized vessel having a relief port the relief valve being designed to provide a controlled release of fluid from the vessel comprising: a fluid impervious cap which will seal the relief port when pressed against the pressure vessel relief port; at least one annular shear plate disposed between the pressure vessel outer surface and the fluid impervious cap the annulus of the shear plate being coaxially aligned with the relief port, the inner annular surface of the shear plate being disposed at an angle to the face of the shear plate to form a tapered surface whereby an exposed surface is always presented to the fluid at the relief port; a plurality of collapsible radially extending membranes attached to the shear plates, pressure vessel and impervious cap which allow the relief valve to be compressed to a closed position where the impervious cap seals the relief port and which holds the fluid impervious cap and annular shear plate in a spaced relationship parallel to the surface of the pressure vessel during release of fluid from the vessel.

* * * * *